(12) United States Patent
Mailath et al.

(10) Patent No.: US 7,407,583 B2
(45) Date of Patent: Aug. 5, 2008

(54) IN-SITU GROUNDWATER NITRIFICATION AND DE-NITRIFICATION REMEDIATION SYSTEM

(75) Inventors: Stephen B. Mailath, Calgary (CA); Ann Chien Chu, Calgary (CA)

(73) Assignee: University Technologies International, LLP, Alberta (CA)

( * ) Notice: Subject to any disclaimer, the term of this patent is extended or adjusted under 35 U.S.C. 154(b) by 0 days.

(21) Appl. No.: 11/090,380

(22) Filed: Mar. 25, 2005

(65) Prior Publication Data

US 2006/0213830 A1 Sep. 28, 2006
US 2007/0221573 A2 Sep. 27, 2007

Related U.S. Application Data

(60) Provisional application No. 60/580,415, filed on Jun. 16, 2004.

(51) Int. Cl.
*C02F 3/02* (2006.01)
(52) U.S. Cl. .................. 210/610; 210/620; 210/758; 166/246
(58) Field of Classification Search .................. 210/610, 210/620, 743, 758, 742; 166/246, 250.01, 166/310
See application file for complete search history.

(56) References Cited

U.S. PATENT DOCUMENTS

| | | | |
|---|---|---|---|
| 3,846,290 A | 11/1974 | Raymond | |
| 4,401,569 A | 8/1983 | Jhaveri et al. | |
| 4,683,064 A | 7/1987 | Hallberg et al. | |
| 4,749,491 A * | 6/1988 | Lawes et al. | ................. 210/610 |
| 5,178,491 A | 1/1993 | Graves et al. | |
| 5,221,159 A | 6/1993 | Billings et al. | |
| 5,384,048 A * | 1/1995 | Hazen et al. | ................. 210/605 |
| 5,480,549 A | 1/1996 | Looney et al. | |
| 5,653,288 A | 8/1997 | Billings et al. | |
| 5,829,918 A | 11/1998 | Chintis | |
| 5,975,800 A | 11/1999 | Edwards et al. | |
| 6,312,605 B1 | 11/2001 | Kerfoot | |
| 6,524,842 B1 * | 2/2003 | Vainberg et al. | ......... 435/262.5 |
| 6,551,815 B1 | 4/2003 | Nuttall et al. | |
| 6,572,773 B1 * | 6/2003 | Dempsey | .................... 210/614 |
| 6,599,425 B2 | 7/2003 | Tartakovsky et al. | |
| 2002/0046972 A1 | 4/2002 | Newman | |

(Continued)

FOREIGN PATENT DOCUMENTS

EP 0315526 10/1991

(Continued)

*Primary Examiner*—Scott Bushey
(74) *Attorney, Agent, or Firm*—Buchanan Ingersoll & Rooney PC

(57) ABSTRACT

A method of in-situ groundwater nitrification, by: extracting groundwater from the ground; adding oxygen to the extracted groundwater; adding nutrients to the extracted groundwater; and injecting the groundwater back into the ground, wherein the oxygen reacts with in-situ nitrifying bacteria to oxidize ammonia to nitrate, and wherein the nutrients encourage the nitrifying bacteria to grow and reproduce. A method of in-situ groundwater de-nitrification, by: extracting the groundwater from the ground; adding carbon to the extracted groundwater; adding nutrients to the extracted groundwater; and injecting the groundwater back into the ground, wherein the carbon reacts with in-situ de-nitrifying bacteria to reduce nitrate to nitrogen gas, and wherein the nutrients encourage the de-nitrifying bacteria to grow and reproduce.

33 Claims, 10 Drawing Sheets

U.S. PATENT DOCUMENTS

| | | |
|---|---|---|
| 2002/0134733 A1 | 9/2002 | Kerfoot |
| 2003/0029792 A1* | 2/2003 | Kerfoot ................. 210/610 |
| 2003/0037924 A1* | 2/2003 | Ellis ..................... 166/268 |
| 2003/0066761 A1 | 4/2003 | Orolin et al. |
| 2004/0007524 A1 | 1/2004 | Noland et al. |
| 2004/0245173 A1* | 12/2004 | Johnson et al. ............. 210/615 |
| 2006/0086663 A1* | 4/2006 | Chowdhury et al. ........ 210/620 |

FOREIGN PATENT DOCUMENTS

| | | |
|---|---|---|
| EP | 0625126 | 3/1994 |

* cited by examiner

Fig. 1: Plot plan of the field site showing treatment and monitoring wells
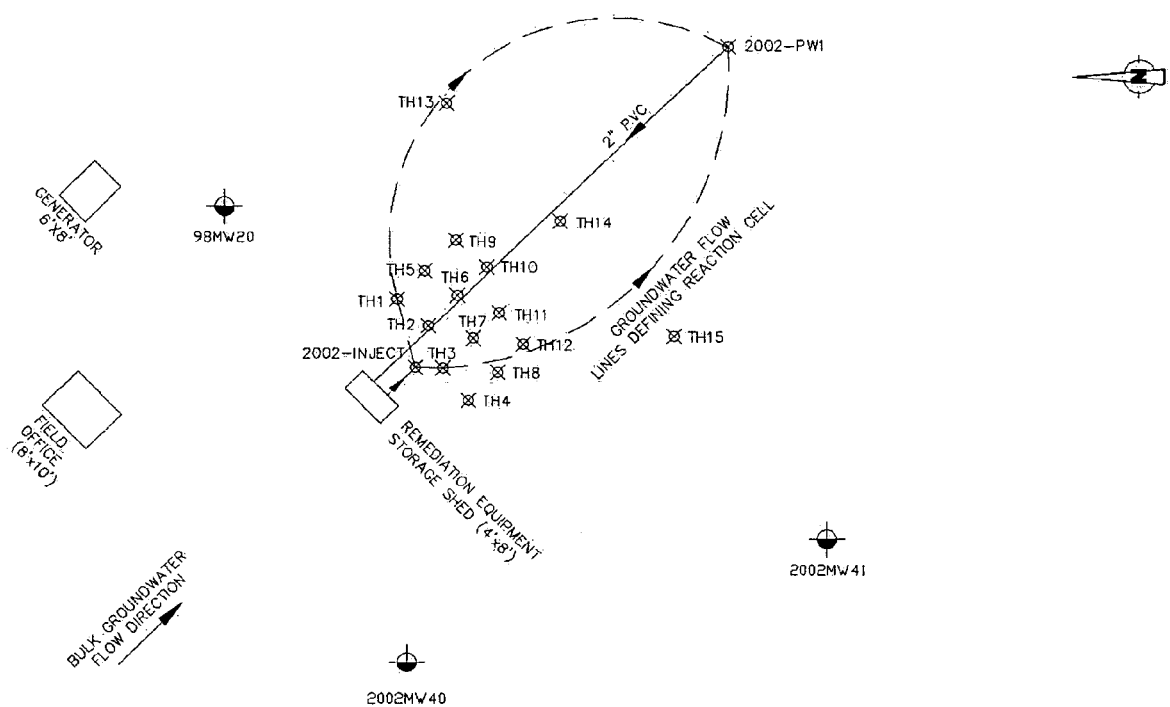

Fig. 2: Cross section showing the nitrification process
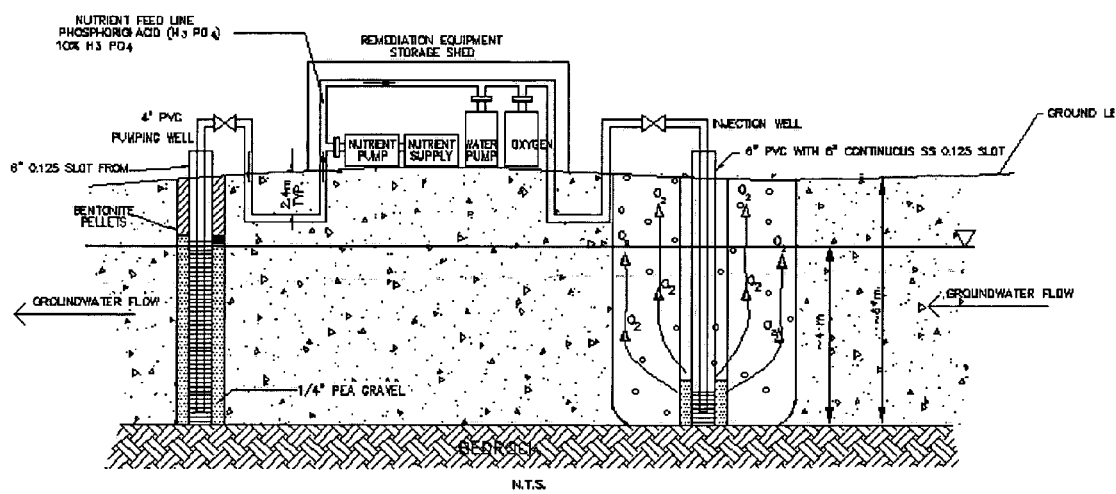

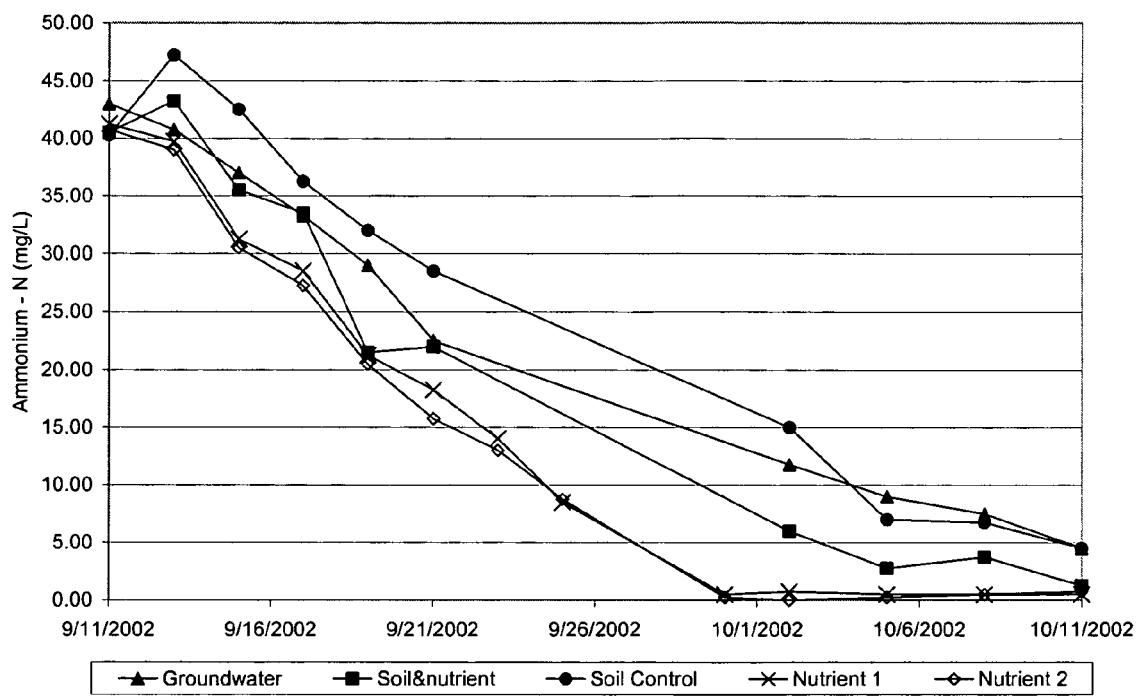
Fig. 3: Ammonia degradation kinetics for ground water only, soil and nutrient addition, killed control, soil only control and nutrient addition replicate reactors incubated at 9°C.

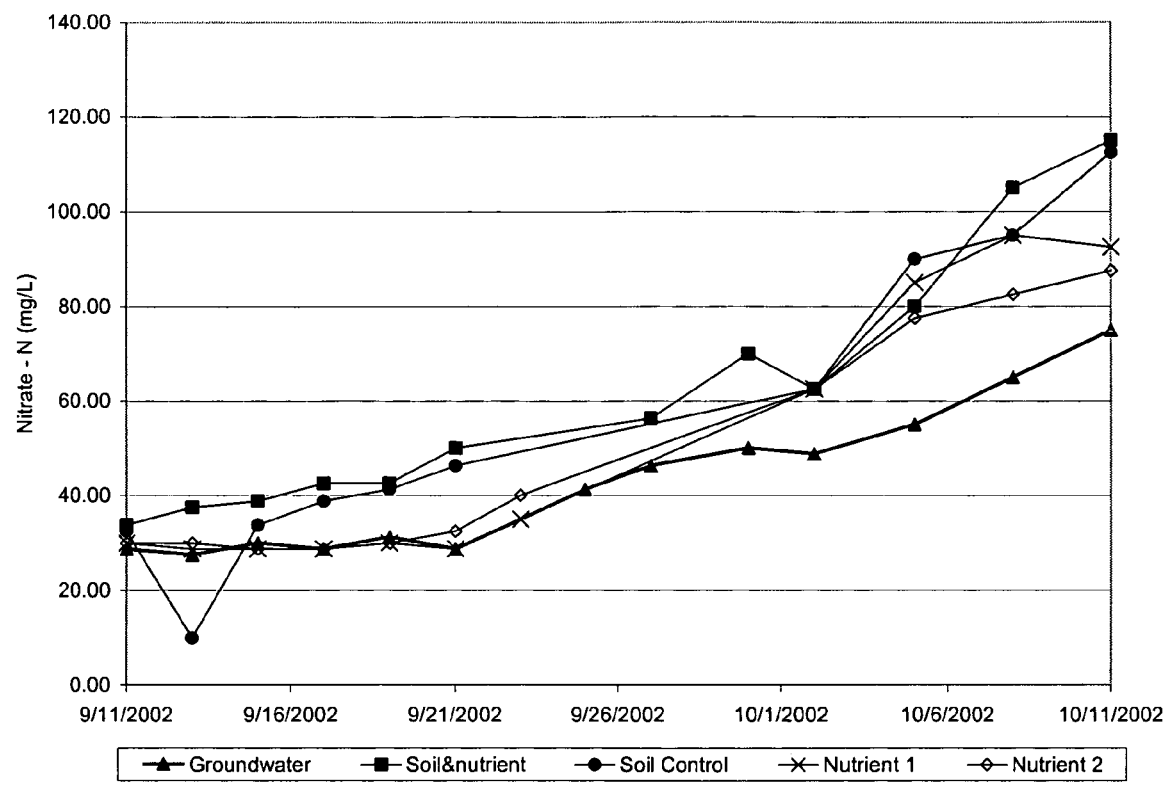
Fig. 4: Nitrate concentrations for ground water only, soil and nutrient addition, killed control, soil only control and nutrient addition replicate reactors incubated at 9°C.

Fig. 5: Ammonia reduction within the reaction cell at monitoring well TH13
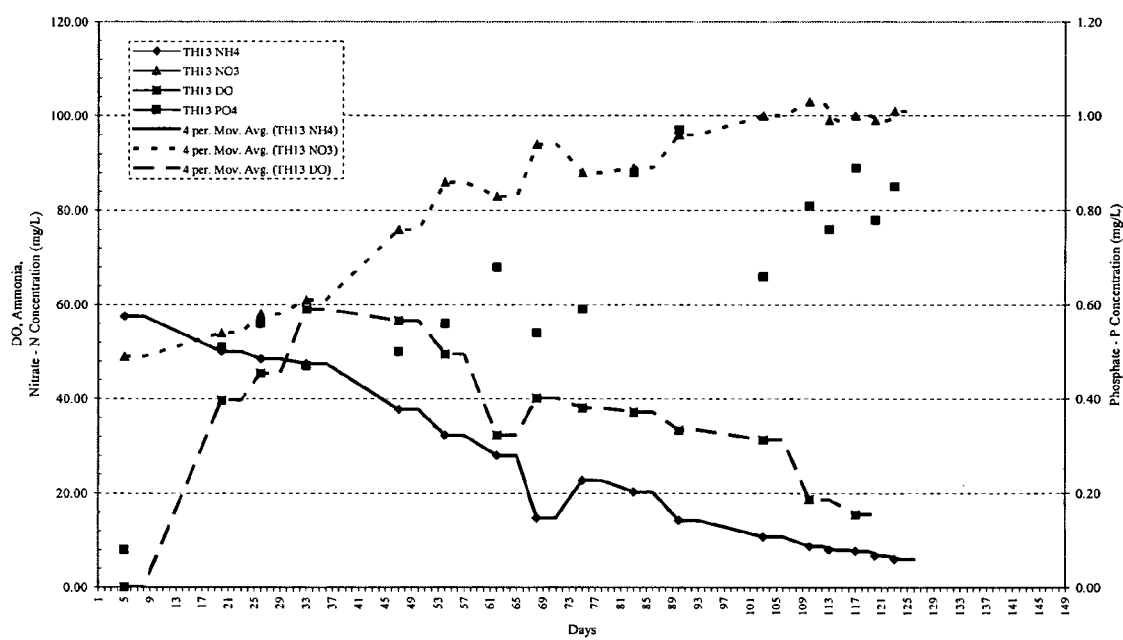

Fig. 6: Representative monitoring well 2002MW41 outside the reaction cell.
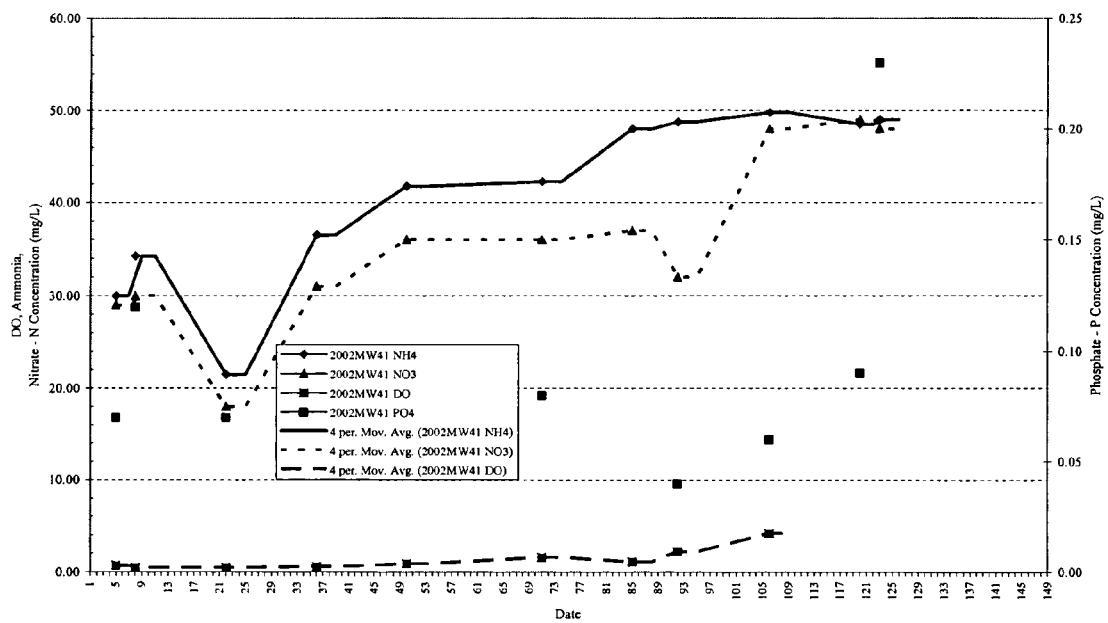

Fig. 7: Cross section showing the denitrification process
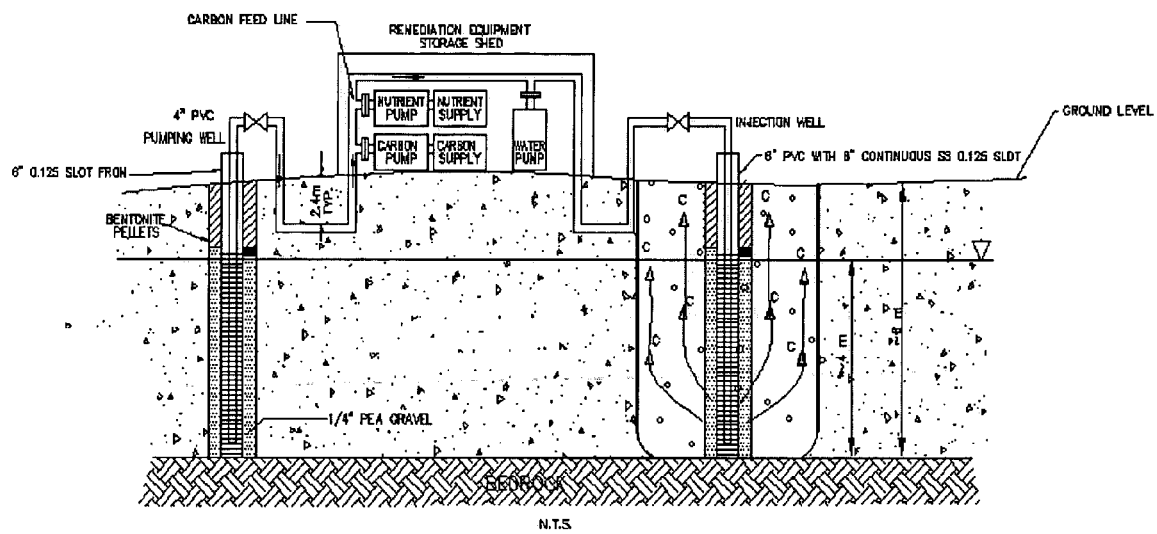

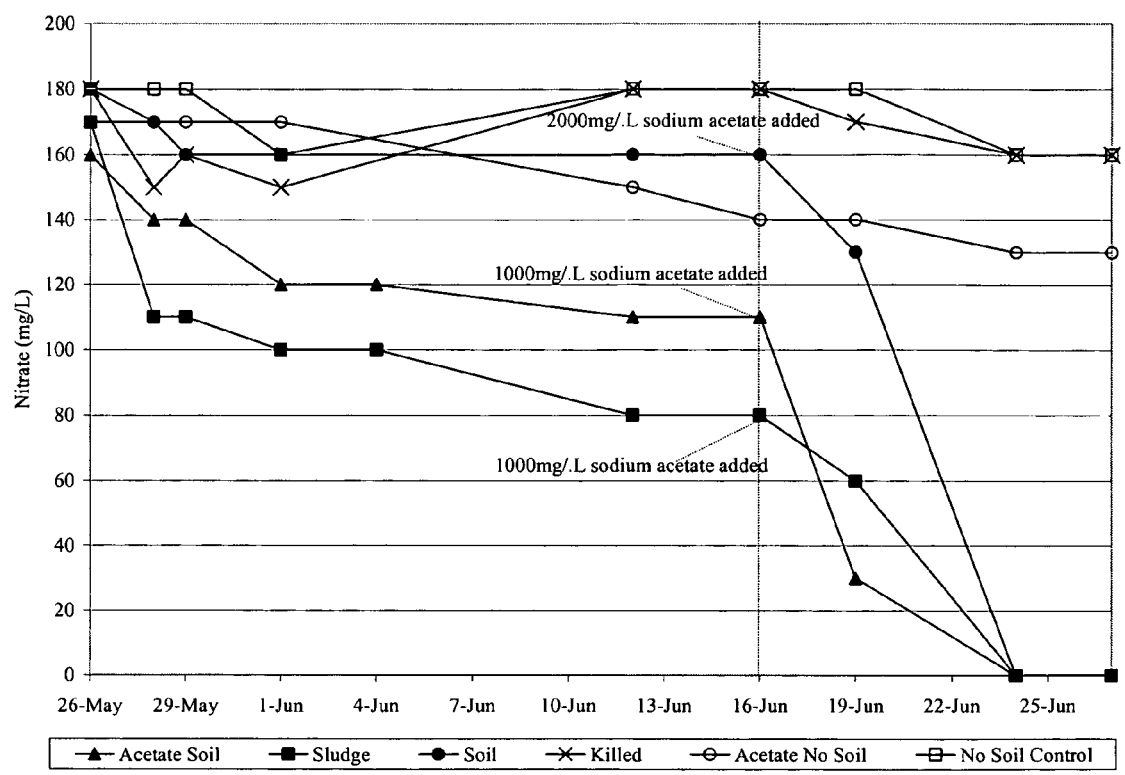
Fig. 8: Nitrate concentrations under various treatments for the denitrification experiment.

Fig. 9: Nitrate reduction in monitoring well TH1 inside the reaction cell
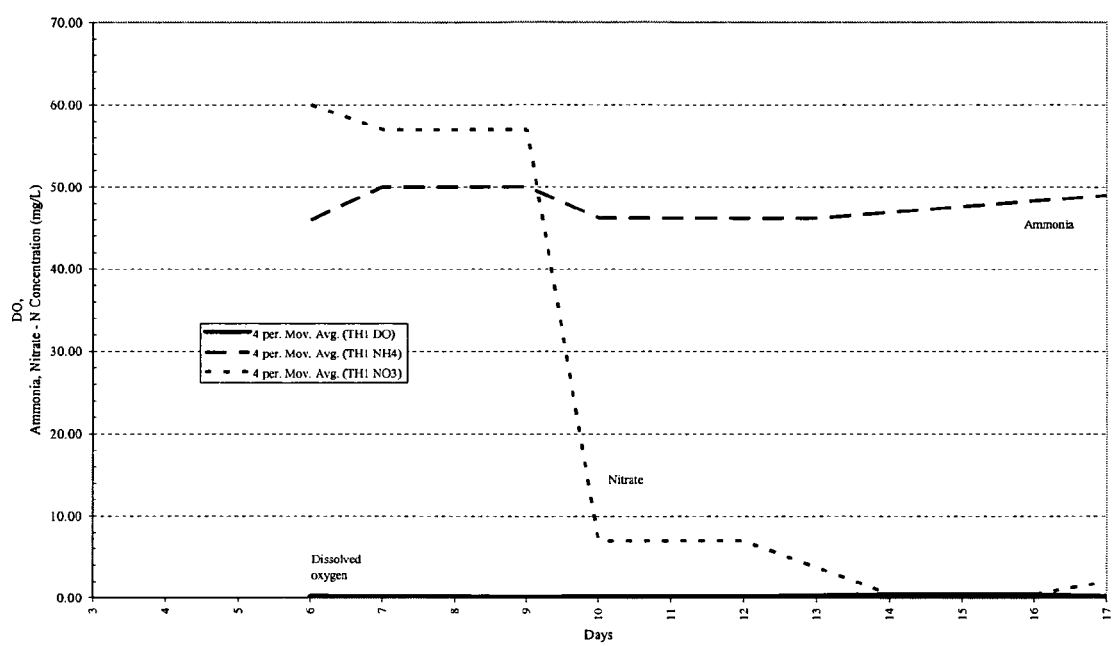

Fig. 10: Representative monitoring well TH41 outside the de-nitrification rection cell
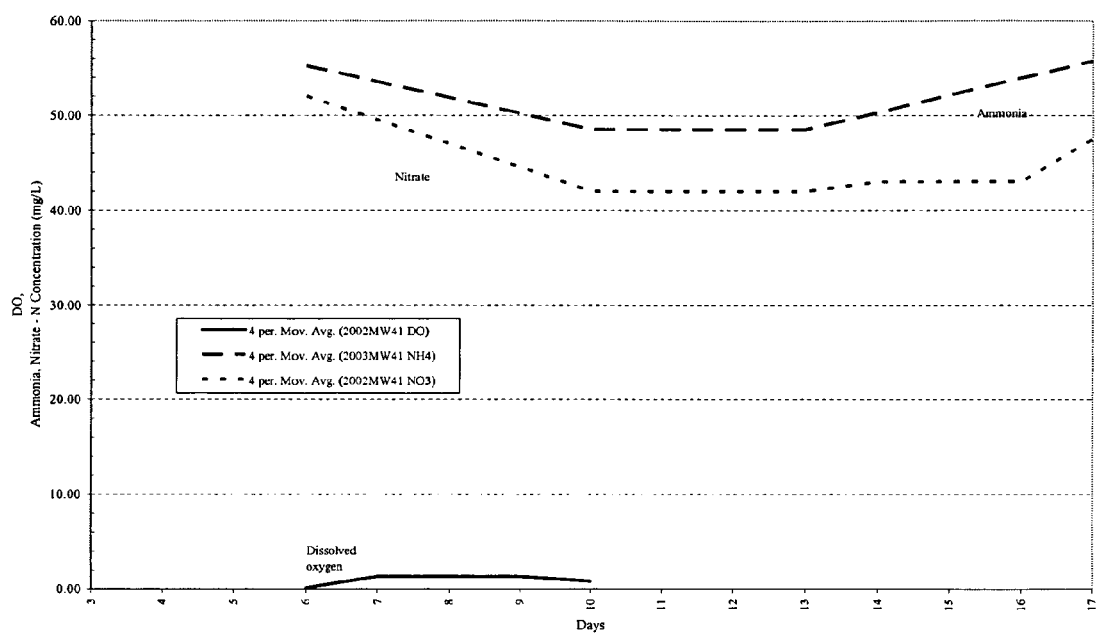

IN-SITU GROUNDWATER NITRIFICATION AND DE-NITRIFICATION REMEDIATION SYSTEM

RELATED APPLICATION

This application claims priority to U.S. provisional patent application No. 60/580,415, filed Jun. 16, 2004 entitled In-Situ Nitrification and Denitrification Remediation Technology of Groundwater.

TECHNICAL FIELD

The present invention may be used to alternately provide in-situ groundwater nitrification by encouraging the growth of nitrifying bacteria in the ground; or to provide in-situ groundwater de-nitrification by encouraging the growth of de-nitrifying bacteria in the ground. In various aspects, nutrients and either oxygen or a carbon source are added to extracted groundwater which is then returned to the ground.

SUMMARY OF THE INVENTION

In one aspect, the present invention provides a method of in-situ groundwater nitrification, by: extracting groundwater from the ground; adding oxygen to the extracted groundwater; adding nutrients to the extracted groundwater; and injecting the groundwater back into the ground, wherein the oxygen reacts with in-situ nitrifying bacteria to oxidize ammonia to nitrate, and wherein the nutrients encourage the nitrifying bacteria to grow and reproduce.

As a result, the present system is ideally suited to remediate groundwater contaminated by ammonia. Elevated ammonia concentrations are a particular problem at fertilizer manufacturing facilities, sewage treatment facilities, agricultural areas and airports.

In another aspect, the present invention provides a method of in-situ groundwater de-nitrification, by: extracting the groundwater from the ground; adding a carbon source to the extracted groundwater; adding nutrients to the extracted groundwater; and injecting the groundwater back into the ground, wherein the carbon source reacts with in-situ de-nitrifying bacteria to reduce nitrate to nitrogen gas, and wherein the nutrients encourage the de-nitrifying bacteria to grow and reproduce.

As a result, the present system is ideally suited to remediate groundwater contaminated by nitrate. Elevated nitrate concentrations are also a particular problem at fertilizer manufacturing facilities, sewage treatment facilities, agricultural areas and airports.

In yet another aspect, the present system provides an integrated system of groundwater remediation, by: in-situ groundwater de-nitrification; and in-situ groundwater nitrification, wherein the in-situ groundwater de-nitrification is performed down gradient of the in-situ groundwater nitrification.

As a result, the present system can be operated such that when groundwater ammonia concentrations are elevated, the nitrification process is used, and conversely, when groundwater nitrate concentrations are elevated, the de-nitrification process is used.

BRIEF DESCRIPTION OF THE DRAWINGS AND TABLES

FIG. 1 is a plot plan of a field site showing extraction (i.e.: pumping) well 2002-PW1, injection (i.e.: treatment) well 2002-INJECT and various monitoring wells (which may be used in either of the preferred nitrification or de-nitrification processes).

FIG. 2 is a cross section showing the in-situ nitrification process in operation.

FIG. 3 shows nitrification bench test results of ammonia degradation kinetics for ground water only (ground water), soil and nutrient amended ground water (soil and nutrient), poisoned reactor (killed control), soil amended ground water (Soil control) and nutrient amended ground water (Nutrient 1 and 2) reactors incubated at 9° C.

FIG. 4 shows nitrification bench test results of nitrate concentrations for ground water only (ground water), soil and nutrient amended ground water (soil and nutrient), poisoned reactor (killed control), soil amended ground water (Soil control) and nutrient amended ground water (Nutrient 1 and 2) reactors incubated at 9° C.

FIG. 5 is a graphical presentation showing the ammonia reductions at a representative monitoring (TH13) well within the reaction cell at the site during the nitrification process.

FIG. 6 is a graphical presentation showing parameters at a representative monitoring well (2002MW41) outside the reaction cell at the site during the nitrification process.

FIG. 7 is a cross section showing the in-situ de-nitrification process in operation.

FIG. 8 shows de-nitrification bench test results of nitrate concentrations for acetate and soil amended ground water (Acetate soil), activated sludge amended ground water (Sludge), soil amended ground water (Test), poisoned reactor (Killed), acetate amended ground water (Acetate no soil) and Ground water only (No soil control).

FIG. 9 is a graphical presentation showing the nitrate reductions at a representative monitoring well (TH1) within the reaction cell at the site during the de-nitrification process.

FIG. 10 is a graphical presentation showing parameters at a representative monitoring well (2002MW41) outside the reaction cell at the site during the de-nitrification process.

Table 1 provides the process reaction and ammonia reduction test results for the nitrification process.

Table 2 provides the process reaction and nitrate reduction test results for the de-nitrification process.

DETAILED DESCRIPTION OF THE DRAWINGS (a) Nitrification

Elevated ammonia concentrations are a particular problem at fertilizer manufacturing facilities, sewage treatment facilities, agricultural areas and airports. Unfortunately, elevated concentrations of ammonia in water can present a freshwater aquatic environment health concern where concentrations exceed approximately 2.6 mg-N/L. Discharges of ammonia contaminated groundwater to aquatic environments is a growing public concern. As will be explained, one aspect of the present invention provides in-situ remediation of ammonia contaminated groundwater in a cost effective manner.

Specifically, the present invention provides a method of in-situ groundwater nitrification, by: extracting groundwater from the ground; adding oxygen to the extracted groundwater; adding nutrients to the extracted groundwater; and then injecting the groundwater back into the ground, wherein the oxygen reacts with in-situ nitrifying bacteria to oxidize ammonia to nitrate, and wherein the nutrients encourage the nitrifying bacteria to grow and reproduce.

Preferably, the conversion of ammonia to nitrate occurs through the following reactions:

$NH_4^+ + \tfrac{3}{2}O_2 \rightarrow NO_2^- + 2H^+ + H_2O$ $$NO_2^- + \tfrac{1}{2}O_2 \rightarrow NO_3^-$$

As a result, the following overall reaction occurs:

$$NH_4^+ + \tfrac{7}{6}O_2 \rightarrow NO_3^- + 2H^+ + H_2O$$

Preferably, such nitrifying bacteria are autotrophic bacteria. The addition of carbon and a phosphate nutrient source results in the following preferred reaction occurring:

$$CO_2 + NH_4^+ + PO_4^{2-} \rightarrow C_5H_7NO_2P_{0.03} \text{ (Bacteria)}$$

In accordance with various aspects of the present invention, the oxygen can be added by adding air, by adding pure oxygen, by adding an oxygen releasing compound, or by any other practical oxygen source. Such oxygen may be added by bubblers. In preferred methods of operation, the oxygen is added in an amount sufficient to maintain oxygen levels above 1 mg/L in groundwater; however, the present invention is not so limited, as other oxygen levels may be used instead.

In accordance with various aspects of the invention, the added nutrients include phosphorus such as phosphate. Such phosphate may be in the form of phosphoric acid; however, the present invention is not so limited, as other nutrients may be used as well. In preferred methods of operation, the phosphorus is added so that the groundwater has a concentration of 0.2 to 0.8 mg/L of phosphate however, the present invention is not so limited, as other phosphate levels may be used instead.

FIG. 1 illustrates the relative locations of an injection well labeled "2002-INJECT" and an extraction (i.e.: pumping) well labeled "2002-PW1" and a plurality of monitoring wells labeled TH" or "MW". FIG. 2 shows a cross sectional view through the ground of a system with an injection well and a pumping (i.e. extraction) well used to illustrate the present nitrification process.

As can be seen in FIG. 1, in preferred methods of operation, the groundwater is extracted at a location that is downgradient of the location where the groundwater is injected back into the ground.

As can be seen in FIG. 2, the oxygen and nutrients may be added to the ground water in an above ground structure (labeled the "REMEDIATION EQUIPMENT STORAGE SHED"). Alternately, however, the oxygen and nutrients may instead be added to the ground water in one or more injection wells.

In further aspects of the invention, the effectiveness of the groundwater nitrification method is monitored by measuring at least one of oxygen concentration, ortho-phosphate, pH or temperature of the groundwater. Such monitoring may be carried out in a separate monitoring well (e.g.: TH wells), or in a monitoring well that is also the groundwater extraction well (e.g.: 2002-PW1) as shown on FIG. 1.

A "reaction cell" as understood herein is the volume of soil in contact with the ground water in which the preferred nitrification (or- denitrification) process is being carried out. In preferred aspects, the effectiveness of the present groundwater nitrification method may be monitored within such the reaction cell. In preferred aspects, such monitoring may simply be carried out in the extraction well (2002-PW1) located downgradient of the injection well (2002-INJECT). Alternately, such monitoring may be carried out in a monitoring well that is outside of the reaction cell. This has the advantage of determining whether excess nutrients are being added to the groundwater. (i.e.: determining whether nutrient concentration outside of the reaction cell is increasing above standard background levels). Therefore, in further aspects of the present invention, the addition of the nutrients is stopped if phosphate is found above background levels in a monitoring well outside of a reaction cell.

The oxygen source is added to the extracted groundwater in a controlled manner, wherein the amount of oxygen required to be added to the groundwater will depend upon the oxygen demand of the nitrifying bacteria in addition to other sources of oxygen consumption within the groundwater. For example, the chemical and biochemical oxygen demand of the groundwater may be more than the stoichiometric oxygen requirement to convert the ammonia to nitrate.

Moreover, in cases where the oxygen demand of the nitrifying bacteria (in addition to other sources of oxygen consumption) exceeds the amount of dissolved oxygen that can be practically transferred to the groundwater, then the extraction well can be placed downgradient of the injection well. This is particularly advantageous in that a substantial portion of the water that was oxygenated is re-oxygenated and injected back into the ground. As a result, the groundwater will be recycled through the extraction well and oxygenation system, and be re-injected into the subsurface groundwater. Such groundwater recycling will result in additional oxygen supplied to the groundwater so that the nitrification process can remove substantive quantities of ammonia.

Advantageously, if the oxygen source is an oxygen releasing compound, then the extraction well does not have to be sited downgradient of the injection well because large quantities of oxygen can be added at once to the groundwater.

The nutrient source is also added to the extracted groundwater in a controlled manner. The nutrient source can be any phosphorus containing nutrient supply such as including phosphate including phosphoric acid. In preferred methods of operation, the nutrient is supplied to the groundwater to maintain a phosphorus concentration of 0.2-0.8 mg/L; however, the present invention is not so limited, as higher concentrations can be added if the nutrient demand exceeds this. In those environments where nutrients may already exist (naturally or having been introduced), there may be situations where little or no nutrient addition may be required.

Preferably, the injection well(s) are located upgradient or substantially upgradient from the extraction well(s) if the amount of oxygen required to remove the ammonia cannot be added all at once. In this way, a substantial proportion of the water, will recycle through the reaction cell to undergo further nitrification in order for substantive ammonia reductions to be achieved.

In accordance with the present invention, there may be one or more injection wells; and the number of injection wells does not have to equal the number of extraction wells. Moreover, the extraction wells do not have to be placed in a circular pattern around an the injection well. Rather, the injection well(s) can be cross gradient or upgradient of the extraction well(s), or between these two locations.

FIG. 1 illustrates a specific, non-limiting, embodiment of the present system (corresponding to FIG. 2) as tested by the present inventors in which the extraction well (2002-PW1) was located 22 m downgradient of the injection well (2002-INJECT). For the particular soils involved, the inventors found the reaction cell of the nitrification process to be approximately 20 m, as measured perpendicular to the direction of groundwater flow halfway between the extraction well (2002-PW1) and injection well (2002-INJECT). This reaction cell size was achieved using an extraction/injection rate of 50 imperial gallons per minute (igpm). The groundwater gradient was 0.023, hydraulic conductivity approximately 50 m/day. It is to be understood that the reaction cell size can be increased by increasing the distance between the injection well and extraction well. For example if the distance of separation is 70 m, then the reaction cell size will extend on the order of 60 m perpendicular to the ground water flow direction. The maximum reaction cell size obtainable in the case where the water is infused with oxygen (with micro or macro bubbles using air or pure oxygen) will ultimately be a function of many separate variables including the groundwater extraction rate, the groundwater injection rate, the groundwater gradient, the oxygen demand, the rate of oxygen consumption and the zone of migration of air/oxygen bubbles. In the case where an Oxygen Releasing Compound (ORC) is used to add oxygen to the groundwater, then the reaction cell size will be the same as the zone occupied by the injected ground water. In both cases, given a constant groundwater extraction and injection rate, the reaction cell size increases with increasing hydraulic conductivity and decreasing groundwater gradient.

To assess the effectiveness of the nitrification process, ammonia concentrations can be monitored using groundwater monitoring wells located downgradient of the injection well(s). In the instance where the extraction well(s) is (are) located downgradient of the injection well(s), then the extraction well(s) may also be used to monitor ammonia concentrations. A number of monitoring wells could be installed in the anticipated reaction cell as well as a few outside the anticipated reaction cell to assess the size of the actual reaction cell. As understood herein, the reaction cell is the portion of the groundwater under the influence of the various amendments added.

In preferred methods of operation, one or more of the dissolved oxygen, ortho-phosphate concentration, pH and temperature could be measured in these monitoring wells to ensure that adequate dissolved oxygen and nutrients are available for the microorganisms to carry out the required nitrification process. Moreover, nitrate and ammonia could also be measured in monitoring wells both inside and outside the reaction cell to assess the kinetics of transformation of ammonia to nitrate. Dissolved oxygen and ortho-phosphate should always be present for effective nitrification to occur. In addition, the pH should decrease and the temperature may increase in the reaction cell due to the nitrification process. The pH, temperature, dissolved oxygen and ortho-phosphate concentrations in monitoring wells outside the reaction cell should be similar to background levels in the groundwater. Therefore, the delivery of oxygen and nutrients (E.G.: phosphate) to the groundwater can be adjusted to maintain preferred levels of both of these compounds. In preferred methods of operation, aerobic conditions are maintained (i.e. dissolved oxygen concentrations above 1 mg/L) and phosphate concentrations are maintained between 0.2 and 0.8 mg/L. If phosphate is found in wells outside of the reaction cell, the addition of phosphate may be stopped.

Nitrification—Bench Scale Testing

The present inventors successfully performed a bench scale study to demonstrate the capabilities of naturally occurring bacteria at the site for their capacity to nitrify ammonia in the groundwater in accordance with the present invention. To do this, contaminated ground water along with alluvial soils collected from a drilling program on site were collected in order to study the feasibility of biological nitrification at 9° C. which is the average groundwater temperatures at the site. The bench scale study consisted of 1 L reactors filled with 800 mL of contaminated ground water. Mixing and surface aeration was supplied by the use of paddle mixers. A number of reactor conditions and controls were examined and their effect on nitrification assessed. FIGS. 3 and 4 show the effect of these reactor conditions on ammonia and nitrate concentrations, as follows.

FIG. 3 illustrates decreasing ammonia concentrations over time. Specifically, this figure shows that ground water amended with phosphate showed the highest nitrification rate and by 18 days the ammonia was gone. It also shows that sufficient phosphate was present in the ground water which resulted in full nitrification realized after a month. The addition of soil had little effect on the nitrification rates.

FIG. 4 illustrates increasing nitrate concentrations over time. Specifically, this figure shows the concomitant increase in nitrate when nitrification is occurring (i.e.: while ammonia is decreasing as shown in FIG. 3). It also shows that in all cases and reactor conditions, nitrate was produced when nitrification occurs.

Nitrification—Field Scale Testing

Following the bench scale testing, the present inventors successfully performed a field scale treatment test. Table 1 and FIGS. 5 and 6 illustrate the success of the field test (using the well layout of FIG. 1), as follows.

Table 1 illustrates the experimental results achieved, showing ammonia concentration reductions at various monitoring wells inside the reaction cell. In addition, FIG. 5 illustrates ammonia reductions at a representative monitoring well (TH13) within the reaction cell during the nitrification process. FIG. 6 illustrates parameters at a representative monitoring well TH41 outside of the reaction cell during the nitrification process.

(b) De-Nitrification:

Elevated nitrate concentrations in groundwater are a particular problem at fertilizer manufacturing facilities, sewage treatment facilities, agricultural areas, airports, etc. Unfortunately, elevated concentrations of nitrate in drinking water can present a human health concern where concentrations exceed 10 mg-N/L. Discharges of nitrate contaminated groundwater to the environment is a growing public concern because adverse human health effects can occur. As will be explained, one aspect of the present invention provides an in-situ system of remediation of nitrate contaminated groundwater in a cost effective manner.

Specifically, the present invention provides a method of in-situ groundwater de-nitrification, comprising: extracting the groundwater from the ground; adding carbon to the extracted groundwater; adding nutrients to the extracted groundwater; and then injecting the groundwater back into the ground, wherein the carbon reacts with in-situ de-nitrifying bacteria to reduce nitrate to nitrogen gas, and wherein the nutrients encourage the de-nitrifying bacteria to grow and reproduce.

Preferably, such de-nitrifying bacteria are attached growth biofilms, and the conversion of nitrate to nitrogen gas occurs through the following reaction:

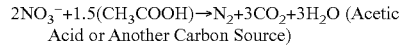
$$2NO_3^- + 1.5(CH_3COOH) \rightarrow N_2 + 3CO_2 + 3H_2O \text{ (Acetic Acid or Another Carbon Source)}$$

The addition of carbon and a phosphate nutrient source results in the following preferred reaction occurring:

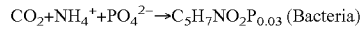
$$CO_2 + NH_4^+ + PO_4^{2-} \rightarrow C_5H_7NO_2P_{0.03} \text{ (Bacteria)}$$

In accordance with the present invention, the carbon may be added by adding at least one of acetic acid, sugar, sugar water, softdrink waste products, whey, yeast wastewater or any other practical carbon source.

In accordance with various aspects of the invention, the added nutrients include phosphorus. Such phosphorus may be in the form of phosphate including phosphoric acid; however, the present invention is not so limited as other nutrients may be used. In preferred methods of operation, the phosphorus may be added so that the groundwater has a concentration of 0.2 to 0.8 mg/L of phosphate, however the present invention is not so limited as other phosphate levels may be used.

In preferred methods of operation, the groundwater may be extracted at a location that is downgradient or cross-gradient of the location where the groundwater is injected back into the ground.

FIG. 1 illustrates the relative locations of an injection well labeled "2002-INJECT" and an extraction (i.e.: pumping) well "2002-PW1" and a plurality of/monitoring wells labeled "TH" or "MW". FIG. 7 shows a cross sectional view through the ground of a system with an injection well labeled "INJECTION WELL" and an extraction well labeled "PUMPING WELL" used to illustrate the present nitrification process. In alternate aspects of the present invention, one or more extraction wells may be used for the removal of groundwater from the aquifer containing the nitrate.

As can be seen in FIG. 1, in preferred methods of operation, the groundwater is extracted at a location that is downgradient of the location where the groundwater is injected back into the ground, however, the present invention is not so limited as the ground water can be injected cross gradient from the position of the extraction well.

As can be seen in FIG. 7, the carbon and nutrients may be added to the ground water in an above ground structure (labeled the "REMEDIATION EQUIPMENT STORAGE SHED"). Alternately, however, the carbon and nutrients may instead be added to the ground water in one or more injection wells.

In further aspects of the invention, the effectiveness of the groundwater de-nitrification method is monitored by measuring carbon concentration and/or phosphate and/or nitrate concentrations in the groundwater. The addition of nutrients may be stopped if nutrients are found in extraction wells positioned downgradient from the reaction cell. Similarly, the addition of carbon may be stopped if carbon is found in monitoring wells positioned downgradient from the reaction cell.

In further aspects of the invention, the effectiveness of the groundwater de-nitrification method may be monitored by measuring at least one of biochemical oxygen demand, chemical oxygen demand, and orthophosphate concentration. The addition of carbon and/or nutrients may be stopped if the biochemical oxygen demand or chemical oxygen demand or nutrients are found above background levels in a monitoring well located outside of the reaction cell.

In further aspects of the invention, the effectiveness of the groundwater de-nitrification method is monitored by measuring at least one of the pH, dissolved oxygen concentration and temperature.

In preferred aspects, such monitoring may be carried out in a monitoring well within the reaction cell. Alternately, such monitoring may be carried out in a monitoring well located outside of the reaction cell. Optionally, such monitoring may also be carried out in a extraction well located downgradient of an injection well.

In accordance with the present invention, the carbon source or readily biodegradable carbon substrate is added to the extracted groundwater in a controlled manner. In various embodiments of the invention, the carbon source may include, but is not limited to, acetic acid, granulated or liquid sugar, sugar water, soft drink manufacturing waste products (e.g.: such as discarded cola or other soft drink products that do not meet manufacturers specs), whey, yeast wastewater, yeast product from beer production, or any other practical carbon source.

The concentration of carbon being added to the groundwater may be varied under different circumstances such that the amount of carbon added will be that which is used to achieve de-nitrification. The concentration of readily biodegradable carbon substrate that is added to the groundwater can be modeled in a number of ways. For example, the mass flux of nitrate entering the reaction cell can be modeled and the stoichiometric carbon equivalent required to reduce the nitrate can then be added to the groundwater, with the groundwater being recirculated between the extraction well(s) and the injection wells. The stoichiometric carbon equivalent of the nitrate in the recirculated groundwater can also be added as specified in the above reactions. There are other numerous ways of calculating the amount of carbon to add. For example, down gradient groundwater samples could be monitored for the added carbon and the addition of carbon stopped if it is encountered down gradient of the reaction cell.

In accordance with the present invention, the nutrient source is added to the extracted groundwater in a controlled manner. In various aspects, the nutrient source can be any phosphorus containing nutrient supply, and may include, but is not limited to, phosphoric acid. In those environments where nutrients may already exist (naturally or having been introduced), there may be situations where little or no nutrient addition may be required.

The concentration of the nutrients to be added can be calculated stoichiometrically as above taking into account standard bacterial growth rates. In one preferred method of operation, the phosphorus concentration is maintained between 0.2 and 0.8 mg/L. There are other numerous ways of calculating the amount of nutrient to add. For example, down gradient groundwater samples could be monitored for the added nutrient and the addition of the nutrient stopped if it is encountered down gradient of the reaction cell.

In accordance with the present invention, the carbon and nutrient (if required) amended groundwater is injected back into the aquifer, or above the aquifer into an unsaturated zone. This may be performed through the use of one or more injection wells. In various aspects of the invention, the injection well(s) can be located upgradient, downgradient or cross gradient from the extraction well(s). Moreover, there may be one or more injection wells for each extraction well. Moreover, the extraction wells do not have to be placed in a circular configuration around the injection well(s).

FIG. 1 illustrates a specific, non-limiting, embodiment of the present system (corresponding to FIG. 7) as tested by the present inventors in which the extraction well (2002-PW1) was located 22 m downgradient of the injection well (2002-INJECT). An advantage of this well configuration is that it ensured that enough carbon and nutrient contact occurs with the attached growth biomass in the reaction cell. For the particular soils involved, the inventors found the de-nitrification reaction cell size to be approximately 20 m, measured perpendicular to the direction of groundwater flow halfway between the extraction well and injection well. This reaction cell size was achieved using an extraction/injection rate of 50 imperial gallons per minute (igpm). The groundwater gradient was 0.023, hydraulic conductivity approximately 50 m/day. The reaction cell size can be increased by increasing the distance between the injection well and extraction wells. For example, if the distance of separation is 70 m, then the reaction cell size is on the order of 60 m perpendicular to ground water flow direction. The maximum reaction cell size obtainable is the same as the zone occupied by the injected ground water. In this case the extraction well and the injection well zone of influence may not overlap. In both cases, given a constant extraction/injection rate, the reaction cell size increases with increasing hydraulic conductivity and decreasing groundwater gradient.

In accordance with the present invention, the effectiveness of the de-nitrification process can be measured by monitoring nitrate concentrations in monitoring wells located downgradient of the injection well(s). When the extraction well(s) is (are) located downgradient of the injection well(s), then the extraction well(s) may also be used to monitor nitrate concentrations. Such monitoring wells could be installed either inside and outside the reaction cell in order to assess the size of the de-nitrification cell.

In accordance with the present invention, the effectiveness of the de-nitrification process can also be measured by monitoring biochemical and/or chemical oxygen demand (BOD and/or COD) and orthophosphate (both inside and outside of the reaction cell). For example, outside the reaction cell the concentration of BOD, COD and phosphate should be similar to background levels. In a preferred method of operation, the orthophosphate concentration is maintained at a concentration between 0.2 and 0.8 mg/L in the reaction cell. Preferably, both BOD and/or COD concentrations are commensurate to the calculated stoichiometric requirement based on the total mass of nitrate required for de-nitrification and the type of readily biodegradable substrate chosen. For example, the BOD and or COD added would double for the same substrate if the nitrate concentrations in the ground waters double. Moreover, since the BOD and/or COD of the same concentrations of different substrate is different, therefore the final amount of BOD and/or COD would change with different substrates. In preferred methods of operation, the pH, dissolved oxygen and temperature could also be measured. It is to be expected that the pH would increase in the reaction cell due to the de-nitrification process and the dissolved oxygen concentration would approach zero for effective denitrification to occur.

In accordance with the present invention, the phosphate or BOD and/or COD may be measured in wells down gradient of the reaction cell. If the phosphate concentration or BOD and/or COD are detected at levels higher than background levels, then the addition of the nutrient and carbon could be stopped.

The size of the reaction cell can be determined since both the carbon and nutrient levels in wells just outside the reaction cell should be similar to background levels. Therefore, nitrate could be measured inside and outside of the cell to assess denitrification kinetics.

De-Nitrification—Bench Scale Testing

The present inventors successfully performed a bench scale study to demonstrate the capabilities of naturally occurring bacteria at the site for their capacity to denitrify fully nitrified ammonia contaminated groundwater. To do this, contaminated ground water along with soils from the site were collected in order to study the feasibility of de-nitrifying fully nitrified groundwaters under batch conditions. Oxygen depleted nitrified groundwater was dispensed into 300 mL BOD bottles for subsequent denitrification experiments. A number of reactor conditions and controls were examined and their effect on denitrification assessed. FIG. 8 shows the effect of these reactor conditions on nitrate concentrations, as follows.

FIG. 8 illustrates decreasing nitrate concentrations over time. Specifically, the figure shows that the additional spike of acetate on June 16 resulted in the rapid denitrification under a variety of different batch conditions including, reactors amended with activated sludge (Sludge), soil from the site (Test), and soil with an initial small acetate spike (Acetate soil). It also shows that in experiments where no acetate was added (Acetate no soil, no soil control, killed) denitrification was not apparent.

De-Nitrification—Field Scale Testing

Following the bench scale testing, the present inventors successfully performed a field scale treatment test. Table 2 and FIGS. 9 and 10 illustrate the success of the field test (using the well layout of FIG. 1), as follows.

Table 2 illustrates the experimental results achieved, showing nitrate concentration reductions at various monitoring wells inside the reaction cell. In addition, FIG. 9 illustrates nitrate reductions at a representative monitoring well TH1 within the reaction cell during the nitrification process. FIG. 10 illustrates parameters at a representative monitoring well TH41 outside of the reaction cell during the de-nitrification process.

(c) Geological Setting Requirements

The present nitrification and de-nitrification remediation methods are especially applicable under site conditions where the hydraulic conductivity is relatively high, such as in sand and sandy gravel deposits. However, it is to be understood that the present remediation methods may be used in any unconsolidated sediment type where there is relatively high hydraulic conductivity. The present invention is not so limited, as the present ground water remediation method may be used in relatively high hydraulic conductivity bedrock deposits such as vugular limestones/dolomites, fractured formations and any other lithologic bedrock.

An advantage of operating the present system in soils with relatively high hydraulic conductivity is that the reaction cell size of the injection wells can be maximized, and the number of injection wells can be minimized, thus resulting in lower cost systems. The reaction cell size in the vicinity the injection wells may optimally be determined using widely recognized aquifer testing methods (including, but not limited to: pump testing and zone of influence assessment, numeric approximation, computer modeling, etc.).

High hydraulic conductivity sediments/bedrock will have wide zones of influence while low hydraulic conductively sediments/bedrock will have narrow zones of influence. Similarly, high hydraulic conductivity sediments/bedrock can accommodate injection of relatively large volumes of water, thereby providing for significant treatment of water, while low hydraulic conductively sediments/bedrock cannot accommodate injection of large volumes of water.

In the preferred nitrification method, the zone of influence of the oxygen and nutrient amended water may also be estimated based upon advective transport models of the injected water.

In the preferred de-nitrification method, the zone of influence of the carbon and nutrient amended water may also be estimated based upon advective transport models of the injected water. High hydraulic conductivity sediments/bedrock have wide zones of influence while low hydraulic conductively sediments/bedrock have narrow zones of influence.

TABLE 1.0

In-situ Nitrification
Reaction:
$NH_4^+ + 7/6\ O_2 \rightarrow NO_3^- + 2H^+ + H_2O$
Field Results
Monitoring Wells Inside Reaction Cell Ammonia concentration (mg-N/L)

| Well | Pre nitrification | After nitrification | % Reduction |
|---|---|---|---|
| TH1 | 47.00 (1) | 11.75 | 75 |
| TH2 | 52.00 (2) | 12.25 | 76.4 |
| TH3 | ~50 | 16.00 | 68 |
| TH5 | 50.25 (2) | 13.75 | 72.6 |
| TH6 | 51.50 (1) | 12.00 | 76.7 |
| TH7 | 50.00 (2) | 10.75 | 78.5 |
| TH9 | ~50 | 12.00 | 76 |
| TH10 | 52.00 (2) | 15.00 | 71.2 |
| TH11 | ∫50 | 11.75 | 76.5 |
| TH12 | 50.75 (2) | 17.00 | 66.5 |
| TH13 | 57.50 (1) | 6.00 | 89.6 |
| TH14 | 58.00 (1) | 12.25 | 78.9 |
| TH15 | 45.25 (1) | 21.50 | 72.9 |
| 2002PWI | 57.75 (1) | 12.25 | 78.8 |

Monitoring Wells Outside Reaction Cell

Ammonia concentration (mg-N/L)

| Well | Pre nitrification | After nitrification | % Reduction |
|---|---|---|---|
| TH4 | 47.00 (1) | 49.25 | NA |
| TH8 | 52.00 (2) | 58.0 | NA |
| 2002MW40 | 43.0 (1) | 39.25 | NA |
| 2002MW41 | 30.0 (1) | 49.0 | NA |

Notes
1. Sampled first day of testing
2. Sampled tenth day of testing

TABLE 2.0

In-situ Denitrification
Reaction:
$2NO_3^- + 1.5(CH_3COOH) \rightarrow N_2 + 3CO_2 + 3H_2O$
Acetic acid or another carbon source
Field Results
Monitoring Wells Inside Reaction Cell Nitrate concentration (mg-N/L)

| Well | Pre denitrifcation | After denitrification | % Reduction |
|---|---|---|---|
| TH1 | 63 | 0.5 | 99 |
| TH2 | 58 | 0.8 | 98.6 |
| TH3 | 66 | 0.2 | 99.7 |
| TH5 | 56 | 12.1 | 78.4 |
| TH6 | 66 | 0.5 | 99.2 |
| TH7 | 57 | 0.5 | 99.1 |
| TH9 | 63 | 0.6 | 99 |
| TH10 | 57 | 0.6 | 98.9 |
| TH11 | 59 | 0.8 | 98.6 |
| TH12 | 56 | 9.0 | 83.9 |
| TH13 | 55 | 4.6 | 91.6 |
| TH14 | 61 | 0.5 | 99.2 |

Monitoring Wells Outside Reaction Cell

Nitrate concentration (mg-N/L)

| Well | Pre denitrification | After denitrification | % Reduction |
|---|---|---|---|
| TH4 | 50 | 53 | NA |
| TH8 | 54 | 30 | NA |
| TH15 | 58 | 18 | NA |
| 2002MW41 | 42 | 52 | NA |

What is claimed is:

1. A method of in-situ groundwater nitrification, comprising:
    extracting groundwater from the ground;
    adding oxygen to the extracted groundwater;
    adding nutrients to the extracted groundwater;
    injecting the extracted groundwater back into the ground; and
    converting ammonia in-situ to nitrate by contacting the injected extracted groundwater with in-situ nitrifying bacteria, wherein the in-situ nitrifying bacteria use the added oxygen to oxidize ammonia to nitrate and the nutrients encourage the in-situ nitrifying bacteria to grow and reproduce.

2. The method of claim 1, wherein the oxygen is added by adding air.

3. The method of claim 1, wherein the oxygen is added by adding pure oxygen.

4. The method of claim 1, wherein the oxygen is added by adding an oxygen releasing compound.

5. The method of claim 1, wherein the oxygen is added by bubblers.

6. The method of claim 1, wherein the oxygen is added in an amount sufficient to maintain oxygen levels above 1 mg/L in the groundwater.

7. The method of claim 1, wherein the nutrients include phosphate.

8. The method of claim 7, wherein the phosphate is phosphoric acid.

9. The method of claim 7, wherein the phosphorus is added so that the groundwater has a concentration of 0.2 to 0.8 mg/L of phosphate.

10. The method of claim 1, wherein the groundwater is extracted at a location that is downgradient of the location where the groundwater is injected back into the ground.

11. The method of claim 1, wherein the oxygen and nutrients are added to the ground water in an above ground structure.

12. The method of claim 1, wherein the oxygen and nutrients are added to the ground water in an injection well.

13. The method of claim 1, further comprising:
    monitoring the effectiveness of the groundwater nitrification method by measuring at least one of oxygen concentration, ortho-phosphate, pH or temperature of the groundwater.

14. The method of claim 13, wherein the monitoring is carried out in a monitoring well within a reaction cell.

15. The method of claim 13, wherein the monitoring is carried out in an extraction well located downgradient of an injection well.

16. The method of claim 13, wherein the monitoring is carried out in a monitoring well outside of a reaction cell.

17. The method of claim 1, further comprising identifying groundwater having an elevated concentration of ammonia.

18. The method of claim 17, wherein the groundwater having an elevated concentration of ammonia is associated with a fertilizer manufacturing facility, a sewage treatment facility, an agricultural area, an airport or any other facility that produces and releases ammonia forming substances or ammonia.

19. The method of claim 18, wherein the elevated concentration of ammonia exceeds 2.6 mg-N/L.

20. The method of claim 1, wherein the in-situ nitrifying bacteria are autotrophic bacteria.

21. The method of claim 1, further comprising extracting the groundwater from an extraction well located downgradient of an injection well and re-oxygenating the extracted groundwater.

22. The method of claim 21, wherein the re-oxygenating the extracted groundwater further comprises recycling the extracted groundwater through the extraction well and an oxygenation system and re-injecting the re-oxygenated groundwater back into the ground.

23. The method of claim 1, wherein extracting the groundwater from the ground is through an extraction well and the injecting of the extracted groundwater into the ground is through an injection well.

24. The method of claim 23, wherein the extraction well further comprises one or more extraction wells.

25. The method of claim 24, wherein the injection well further comprises one or more injection wells.

26. The method of claim 25, further comprising one or more extraction wells, which are placed in a circular pattern around one or more injection wells.

27. The method of claim 25, wherein the one or more injection wells are cross gradient of the one or more extraction wells.

28. The method of claim 25, wherein the one or more injection wells are upgradient of the one or more extraction wells.

29. The method of claim 1, wherein the groundwater substantially flows from an upgradient to a downgradient.

30. A method of in-situ groundwater nitrification, comprising:
  identifying groundwater having an elevated concentration of ammonia;
  extracting the groundwater from the ground;
  adding an oxygen releasing compound to the extracted groundwater;
  injecting the extracted groundwater back into the ground, and
  converting ammonia in-situ to nitrate by contacting the injected oxygenated groundwater with in-situ nitrifying bacteria, and wherein the in-situ nitrifying bacteria use the added oxygen to oxidize ammonia to nitrate.

31. The method of claim 30, further comprising adding a phosphorus containing nutrient source to the extracted groundwater to encourage the nitrifying bacteria to grow and reproduce.

32. The method of claim 31, wherein the phosphorus containing nutrient supply is a phosphoric acid.

33. A method of in-situ groundwater nitrification, comprising:
  identifying groundwater having a concentration of ammonia in excess of 2.6 mg-N/L;
  extracting a portion of the groundwater from the ground;
  adding oxygen to the extracted groundwater;
  adding nutrients to the extracted groundwater;
  injecting the extracted groundwater back into the ground; and
  converting ammonia in-situ to nitrate by contacting the injected extracted groundwater with in-situ nitrifying bacteria, wherein the in-situ nitrifying bacteria use the added oxygen to oxidize ammonia to nitrate and the nutrients encourage the in-situ nitrifying bacteria to grow and reproduce.

* * * * *